Sept. 29, 1959  A. G. GETZ  2,906,099
ADJUSTMENT INDICATING REAR VIEW MIRROR ADJUSTING MEANS
Filed June 9, 1958  6 Sheets-Sheet 1

Sept. 29, 1959 A. G. GETZ 2,906,099
ADJUSTMENT INDICATING REAR VIEW MIRROR ADJUSTING MEANS
Filed June 9, 1958 6 Sheets-Sheet 5

INVENTOR.
Arnstead G. Getz,
BY
Brown, Jackson, Bretcher & Diennen
Atty's

United States Patent Office 2,906,099
Patented Sept. 29, 1959

2,906,099

ADJUSTMENT INDICATING REAR VIEW MIRROR ADJUSTING MEANS

Arnstead G. Getz, Lakewood, Ohio, assignor to The Bishop and Babcock Manufacturing Company, Cleveland, Ohio, a corporation of Ohio Application June 9, 1958, Serial No. 740,648

14 Claims. (Cl. 60—97)

This invention relates to remotely controlled means for effecting desired adjustment of automotive rear view mirrors and analogous devices.

Rear view mirrors for automotive vehicles are well known and extensively used. It is frequently desirable to change the setting of such a mirror to assure better vision of traffice approaching from the rear. In many cases the mirror is mounted at the exterior of the vehicle and is not readily accessible to the driver, and may, in some instances, be spaced a considerable distance from the driver by being mounted on a support or arm of substantial length. Adjustment of an exterior rear view mirror by hand often may be difficult and if attempted while driving may be dangerous in respect to possible collision.

My invention is directed to means for effecting desired adjustment of rear view mirrors, particularly mirrors disposed exteriorly of automotive vehicles, by an adjustment control mounted on the instrument panel or in any suitable location readily accessible to the driver when seated. To that end I provide simple and efficient means whereby desired adjustment of the mirror may be effected by suction derived from a suitable source, conveniently the intake manifold of the engine of the vehicle, under control of valve means readily accessible to the driver. The means for adjusting the mirror also assures that it will be held in the desired adjustment and enables adjustment in small increments both vertically and horizontally throughout the required range of adjustment. A further and important object of my invention is the provision of comparatively simple, compact and highly efficient control valve means for both controlling adjustment of the mirror and clearly indicating the character or direction of such adjustment. While my invention is particularly suitable for adjusting rear view mirrors, in certain respects, it is suitable, in its broader aspects, for adjusting various devices. It will be understood, therefore, that in the following disclosure my invention is shown as used for adjusting a mirror by way of example only and not by way of limitation. Further objects and advantages of my invention will appear from the detail description.

The mirror and adjusting means therefor of my instant invention is in the nature of an improvement, in certain respects, over the remotely controlled rear view mirror of my copending application, Serial No. 716,685, filed February 21, 1958, as will appear more fully hereinafter.

The mirror, to be described more fully presently, is mounted in a suitably formed rearwardly opening housing 18 having a reduced neck 19 extending from a suitably formed base 20 provided with appropriately disposed openings for reception of securing screws or bolts for mounting the housing upon a suitable support. A suitably formed mounting frame 21 is secured by screws to a bridge element 22 of neck 19. A rearwardly extending stud 23 is secured in frame 21 and extends rearward therefrom and is provided at its rearward end with a reduced neck 24 provided at its outer end with an integral ball 25. Neck 24 extends through an opening 26 in a boss 27 integral with a mirror mounting plate 28 at the front thereof. The plate 28 preferably is in the form of a die casting and is of circular or disc form being provided with a rearwardly extending circumferential flange 29 for retaining a mirror 30 mounted therein and secured in plate 28 in any suitable manner, conveniently by means of a suitable adhesive. The boss 27 is closed at one end by a wall 31 and is interiorly threaded from its other end for reception of a screw plug 32. The ball 25 of stud 23 is confined between the inner end of plug 32 and a cylindrical follower 33 slidable in boss 27 and held in pressure contact with ball 25 by a compression spring 34 confined between follower 33 and end wall 31 of boss 27. The inner end of plug 32 is recessed conformably to ball 25, as is the end of follower 33 remote from wall 31. The ball 25 is thus frictionally gripped between the plug 32 and follower 33 effective for preventing objectionable looseness or play of the mounting plate 28. By turning the plug 32 in appropriate direction the friction grip exerted upon the ball 25 may be adjusted to hold the mounting plate 28 and the mirror 30 in adjustment without presenting objectionable frictional resistance to adjustment thereof. The ball 25 is so disposed that the lengthwise axis thereof and of stud 23 coincides with the center of plate 28. By threading the plug 32 outwardly of boss 27 sufficiently to release the friction grip on ball 25, the latter may be withdrawn through opening 26, which is of slightly greater diameter than ball 25, permitting ready removal and replacement of plate 28 and mirror 30, as may be desired or necessary.

Figures 1, 2, 3:
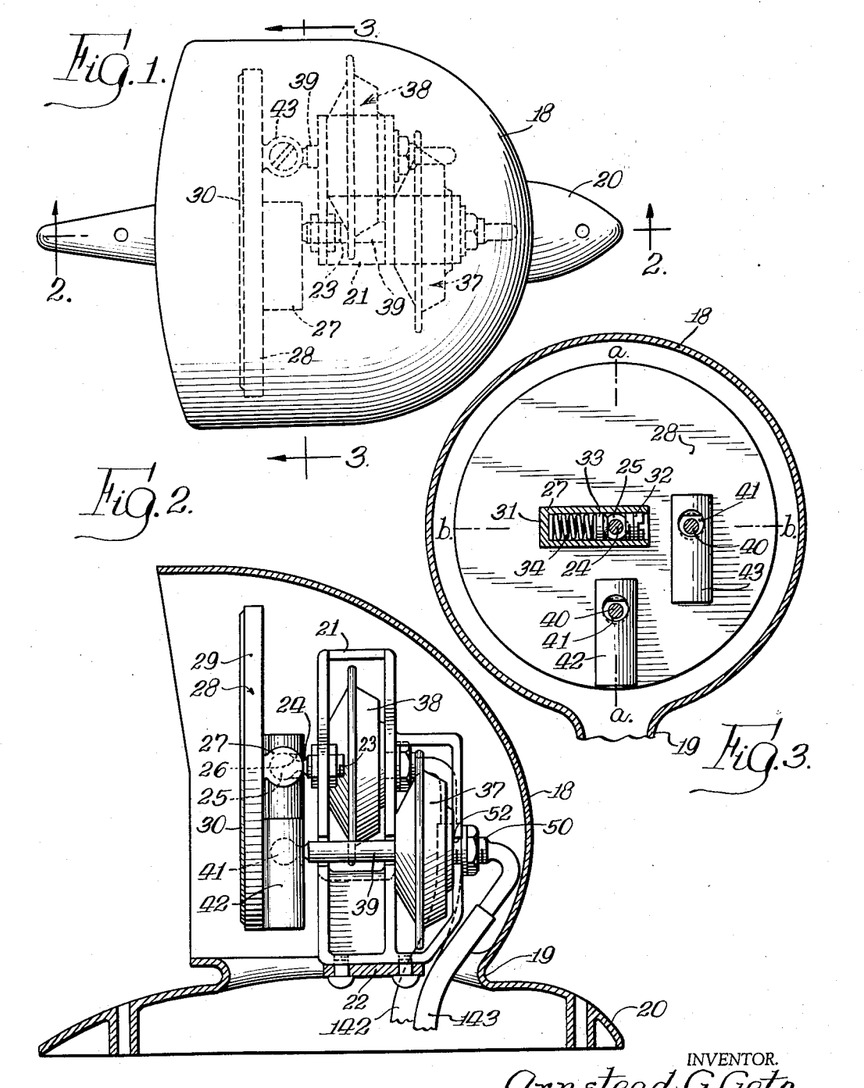
Figure 1 is a top plan view of the housing and mirror adjusting means therein embodying my invention.
Figure 2 is a sectional view taken substantially on line 2—2 of Figure 1, the mirror and the adjusting motors and the mounting frame therefor being shown in elevation.
Figure 3 is a sectional view taken substantially on line 3—3 of Figure 1, one of the bosses on the back of the mirror mounting plate being shown in section.

As will be understood from what has been said, the stud 23 and associated parts provide a ball and socket mounting for the plate 28 rendering possible universal adjustment of the latter and, more particularly, adjustment about a transverse vertical axis a—a and a transverse horizontal axis b—b, indicated in Figure 3. Adjustment of the mirror unit comprising plate 28 and mirror 30 is effected by two suction motors 37 and 38, to be described more fully presently, mounted on frame 21. Each of the motors 37 and 38 is provided with a rearwardly extending operating rod 39 to the rearward end of which is attached, by a reduced neck 40, a ball 41. The ball 41 of rod 39 of motor 37 extends into a boss 42 similar to boss 27 and also formed integrally with plate 28, and is frictionally held within boss 42 in the same manner in which ball 25 is held within its boss 27. Referring to Figure 3, it will be noted that the ball 41 in boss 42 is centered on the vertical axis a—a of plate 28, and is disposed a material distance below the horizontal transvers axis b—b. The ball 41 of operating rod 39 of motor 38 extends into a boss 43 similar to boss 42 and is frictionally held therein in the same manner as ball 25 is held in boss 27. Boss 43 also is formed integrally with plate 28 and ball 41 is centered on the transverse horizontal axis b—b and disposed a material distance to one side of the transverse vertical axis a—a. The operating rods 39 of the motors 37 and 38 are yieldingly urged rearward—in a direction toward the mirror unit. When the rods 39 of motors 37 and 38 are midway between their fully projected positions and their fully retracted positions the mirror unit is in its vertical position shown in Figures 1 and 2, perpendicular to the lengthwise axis of housing 18, and is securely held in that position by the operating rods 39.

Figures 4, 5, 6, 7:
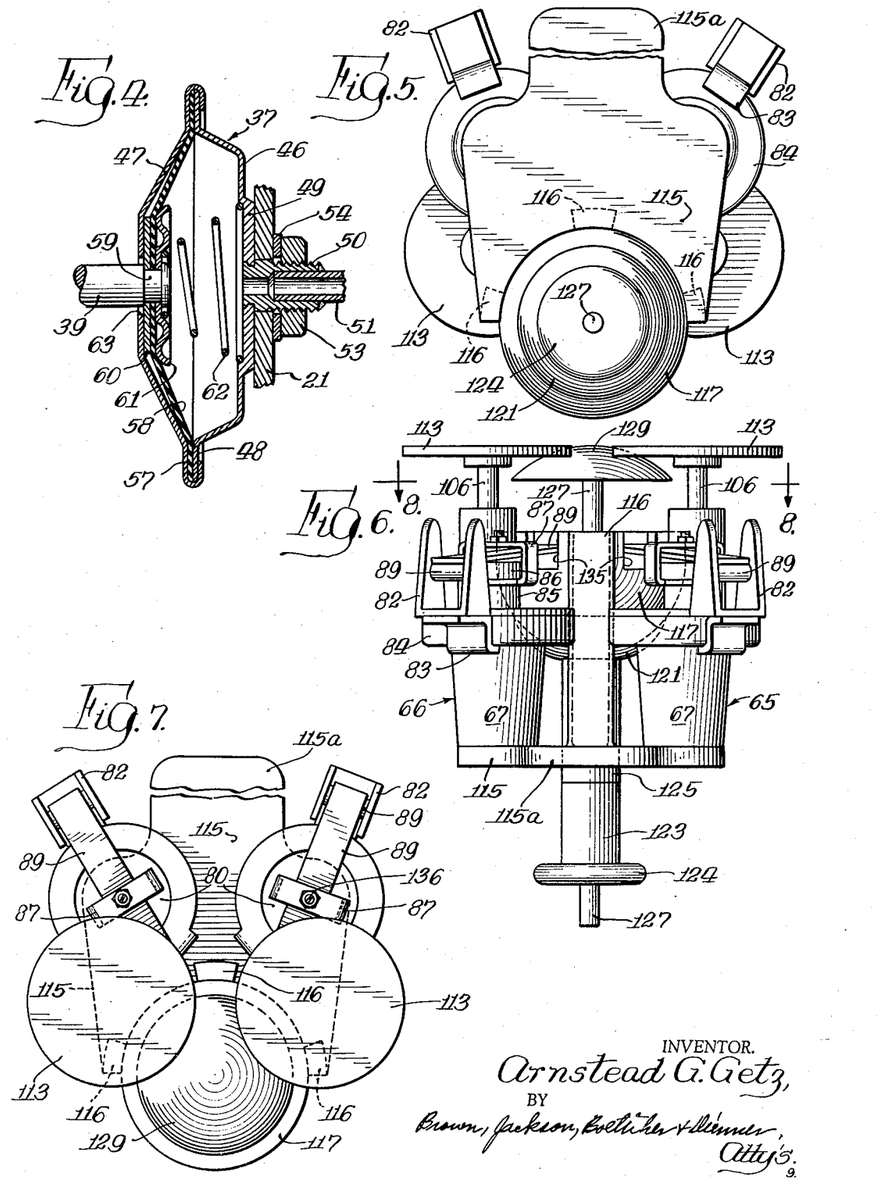
Figure 4 is an axial sectional view of one of the mirror adjusting motors, on an enlarged scale, certain parts being shown in elevation.
Figure 5 is a rear view of the control valve assembly.
Figure 6 is a top plan view of the control valve assembly.
Figure 7 is a front view of the control valve assembly.

The suction motors 37 and 38 are of the same construction and a description of one thereof, motor 37 for example, will suffice. Referring to Figure 4, motor 37 comprises a base section 46 and a cover section 47 together defining an interior chamber. The base section is of approximately frusto-conical shape and preferably is in the form of a die casting provided at its rearward or larger end with an outwardly extending circumferential flange 48 and, at its forward or smaller end or base with a thickened boss 49 having a central forwardly extending and exteriorly threaded neck 50 from which extends a reduced nipple 51 opening through neck 50 and boss 49 into the chamber within motor 37. The mounting frame 21 is provided with a suitably disposed slot 52 (Figure 2) which snugly receives neck 50 for mounting motor 37 on frame 21. A securing nut 53 is threaded on the forward end of neck 50 and seats on a spring washer 54 seating on the forward face of frame 21, effective in cooperation with boss 49 for clamping motor 37 in position on frame 21 with operating rod 39 thereof accurately aligned with boss 42 and with the vertical transverse axis a—a of the mirror mounting plate 28. The suction motor 38 is mounted on frame 21 in the same manner as motor 37 but is spaced a short distance rearward thereof, it being noted that the operating rod of motor 37 is of greater length than the rod 39 of motor 38 to compensate for the difference in spacing of the motors from the mirror unit.

The cover section 47 of motor 37 conveniently is formed as a sheet metal stamping and is bent tightly about flange 48 of base section 46 so as to clamp tightly between flange 48 and a flat comparatively narrow circumferential element 57 of cover section 47 the marginal portion of a diaphragm 58 formed of any suitable material, such as a rubberized fabric. The inner or forward end portion of operating rod 39 is reduced in diameter to provide a stud 59 which extends through a flat brass disc 60 seating on the rearward face of diaphragm 58 concentric therewith, the center of diaphragm 58 and a corrugated brass disc 61 seating on the inner or forward face of diaphragm 58, the forward end of stud 59 being peened over effective for tightly securing rod 39 to diaphragm 58 and tightly clamping the central portion of the diaphragm between the discs 60 and 61. A spiral compression spring 62 is confined between boss 49 of base section 46 and disc 61 with its smaller end or base seating on disc 61 concentric with stud 59. The cover section is provided with an opening 63 of somewhat greater diameter than the rod 39 and through which the latter extends.

Figure 8:
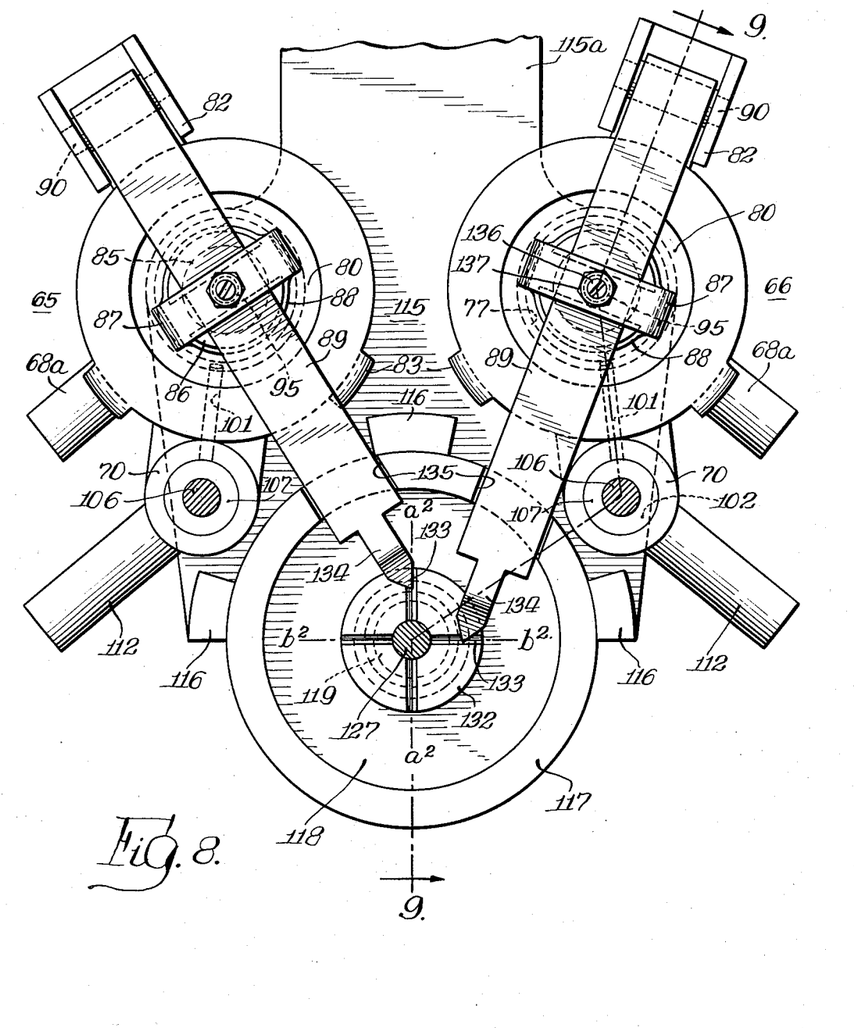
Figure 8 is a sectional view, on an enlarged scale, taken substantially on line 8—8 of Figure 6.
Figure 9:
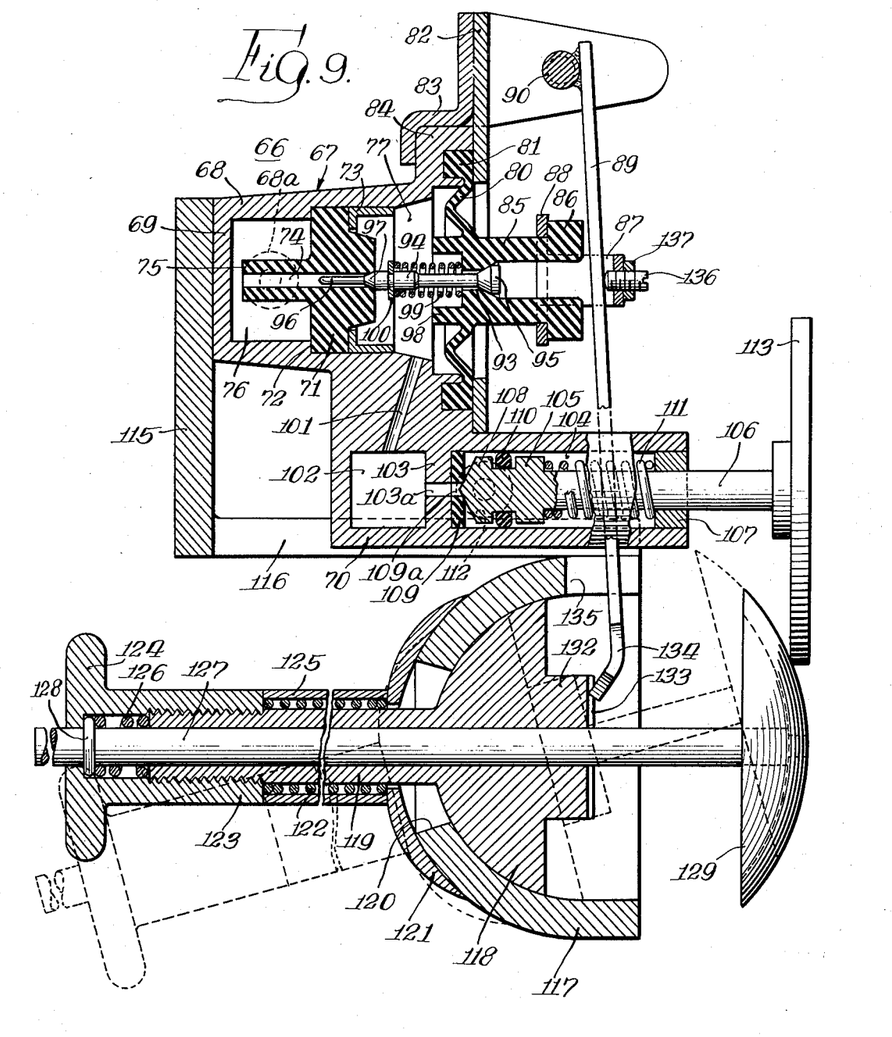
Figure 9 is a sectional view, on an enlarged scale, taken substantially on line 9—9 of Figure 8, with certain parts broken away for clearness of illustration and certain parts shown in elevation, the operating control means being indicated in broken lines in one of its extreme adjusted positions.

Connection of the motors 37 and 38 to suction and to atmosphere, to variable extent, is effected by means of the control valve assembly shown more clearly in Figures 5 to 9, inclusive. The control valve assembly includes two control valve units 65 and 66, one for each motor. The units 65 and 66 are similar and a description of one thereof will suffice. Referring to Figure 9, each unit comprises a housing 67, including a cylinder 68 closed at its rearward end by an end wall 69, and a barrel 70 integral with cylinder 68 and disposed parallel therewith. A nipple 68a, integral with cylinder 68, opens into cylinder 68 of unit 66 a short distance beyond end wall 69 and, in practice, is connected to a suitable source of suction, such as the intake manifold of the automobile engine, as will be explained more fully presently. A valve seat member 71, formed of suitable material, such as rubber, seats on an interior circumferential shoulder 72 of cylinder 68 forward of the opening of nipple 68a. A flanged retainer 73, suitably secured in cylinder 68, as by having a push fit therein, seats on the front marginal portion of valve seat member 71 for retaining it in position within the cylinder. The valve seat member 71 is provided with a central restricted passage 74 extending from its forward face and defined in part by a reduced neck 75 extending rearward from member 71, the forward portion of passage 74 being slightly flared or of frusto-conical shape to provide a valve seat. The valve seat member 71 divides the cylinder 68 interiorly into a rear primary suction chamber 76 and a front air inlet chamber 77 with the passage 74 providing a restriction therebetween. The unit 65 is also provided with a nipple 68a opening into suction chamber 76 thereof similarly to nipple 68a of unit 66.

The air inlet chamber 77 is closed at its forward end by a diaphragm 80 formed of any suitable material, such as rubber, having a thickened forwardly extending circumferential flange 81 seating in a corresponding channel in the forward end of cylinders 68. A bracket 82 seats upon flange 81 and is secured to cylinder 68 by fingers 83 bent about flange 84 of cylinder 68 and effective for holding the bracket 82 tightly in position with the flange 81 of diaphragm 80 confined under pressure in the channel of cylinder 68 so as to provide an air tight seal therewith. The diaphragm 80 is provided with a central forwardly extending neck 85 of tubular form having at its forward end an outer circumferential flange 86. A stirrup 87 of substantially inverted U-shape extends forwardly beyond neck 86 and is provided at its rearward end with a ring 88 fitting about neck 85 and in rear of flange 86 thereof. A lever 89 is pivoted at 90 in bracket 82, this lever comprising a spring steel strip of substantial width. The lever 89 is resilient and provides, in conjunction with stirrup 87, a yielding connection between lever 89 and neck 85 of diaphragm 80 for moving the latter forward. The neck 85 is tubular, as shown, and is provided with a central opening 93 through which extends a primary valve member 94. The body of valve member 94 is of less diameter than opening 93 and is provided at its forward end with a frusto-conical valve element 95 of materially greater diameter than opening 93 and adapted for cooperation with a valve seat formed in neck 85 and extending forward from opening 93. At its rearward end valve member 94 is provided with a reduced rearwardly extending finger 96 extending into passage 74 for guiding valve member 94 in its movement. At the forward end of finger 96 the primary valve member is formed to provide a substantially frusto-conical valve element 97 which cooperates with the valve seat at the forward end of passage 74. A tubular neck 98 extends rearward from neck 85, as a continuation thereof, and receives the forward end portion of a compression spring 99 disposed about the primary valve member 94 and confined between the rearward end of neck 85 and a snap ring 100 engaging in a groove in valve member 94. As will be understood from what has been said, when the diaphragm 80 is in its rearward position shown in Figure 9, the valve element or head 95 of the primary valve member 94 is seated in the forward end of opening 93, closing the air inlet chamber 77 to atmosphere and element 97 of valve member 94 is held seated by the compression spring 99 effective for closing the passage 74 and thereby closing the primary suction chamber 76 to the air inlet chamber 77.

The housing 67 of each unit is provided with a duct or passage 101 opening from the air inlet chamber 77 into forward chamber 102 of barrel 70 in front of a relatively thick cross web element 103 thereof dividing the barrel 70 into the forward chamber 102 and the rearward chamber 104 extending from the rearward end of barrel 70 to the element 103. A sealing valve member 105 is slidably mounted in chamber 104 and is provided with a reduced stem 106 slidable through a plug 107 secured in the rearward end of chamber 104 in any suitable manner, conveniently by having a press fit therein. The valve member 105 is provided at its rearward end with a substantially frusto-conical head 108 which seats in a valve seat member 109, in the form of a rubber ring seating against the forward face of element 103 of barrel 70 and having an opening 109a aligned with an axial passage 103a in web element 103. The body portion of valve member 105 is provided with a circumferential groove receiving an O seal ring 110 providing an air tight seal about the valve member, the latter being urged toward seated or closed position by a compression spring 111 disposed about stem 106 and confined between the body of valve member 105 and plug 107. The barrel 70 is further provided with a nipple 112 opening into the chamber 104 adjacent the valve seat member 109. As will be understood from what has been said, when the valve member 105 is in its seated or closed position shown in Figure 9, the chamber 104 is closed to the air inlet chamber 77.

As above noted, there are two control valve units 65 and 66, one for each of the motors 37 and 38. The stems 106 of sealing valves 105 extend a material distance forward beyond barrels 70 and a disc 113 of substantial diameter is secured on the forward end of each stem 106. The two units are suitably secured to a mounting plate 115, as shown in Figures 5 to 8, inclusive. The lower edge of plate 115 is of arcuate shape, for a purpose which will appear presently. Plate 115 is provided, at its lower edge, with three forwardly extending arms 116, two of which are disposed at each side thereof. An approximately hemispherical socket member 117 is secured between the forward ends of arms 116 and receives a substantially hemispherical head 118 having a tubular neck 119 extending through an opening 120, of greater diameter than neck 119, in the rearward portion of socket member 117, shown more clearly in Figure 9. An arcuate cap 121 is held seated on the rearward portion of socket member 117, to cover opening 120 thereof, by a compression spring 122 disposed about neck 119 and confined between cap 121 and the rearward end of a handle member 123 threaded on the rearward portion of neck 119 and provided at its rearward end with a circumferential flange 124 of substantial thickness. Preferably, though not necessarily, the spring is enclosed by a sleeve 125 disposed thereabout and confined between the cap 121 and the forward end of member 123. The length of sleeve 125 is such that spring 122 is maintained under pressure by member 123 adequate to hold cap 121 is pressure contact with socket member 117 sufficient to assure that head 118 will be held in any position of adjustment to which it may be moved.

The handle member 123 extends rearward a material distance beyond neck 119 and receives a compression spring 126 disposed about a plunger 127 slidable through neck 119 and the rearward end of member 123. The compression spring 126 is confined between the rearward end of neck 119 and a suitable abutment 128, conveniently a snap ring, on plunger 127 and normally holds the latter in its rearward retracted position extending beyond the rearward end of member 123. A spherical head 129, the forward face of which is concentric with the same center as head 118, is secured on the forward end of plunger 127, which extends a substantial distance beyond the forward face of head 118. The head 129 is of substantial diameter, such that it overlaps both of the discs 113 in proximity thereto in any adjusted position of head 118, when plunger 127 is in its retracted position. Accordingly, when plunger 127 is projected, by pressure applied to its rearward end, head 129 thereof contacts both of the discs 113 and opens both of the sealing valve members 105, for a purpose to be explained presently.

The head 118 is provided with a forwardly extending concentric hub 132 of considerably reduced diameter having a flat or planar front face preferably, though not necessarily, provided with four radial grooves 133 of substantially V cross section spaced ninety degrees apart, as shown more clearly in Figure 8. The actuating lever 89 of each of the control valve units 65 and 66 is provided at its inner end with a forwardly curved finger 134 having a V shaped point engaging in one of the grooves 133, the two grooves so engaged being at an angle of ninety degrees to each other, as in Figure 8, and the socket member 117 is provided with slots 135 through which levers 89 extend and which are of but slightly greater width than levers 89, effective for restraining the latter against appreciable lateral movement. The fingers 134 in cooperation with grooves 133 tend to restrict head 118 to rocking or tilting movement in two planes perpendicular to each other, corresponding to the planes of grooves 133. As above indicated, the grooves 133 are not essential, though preferred, and may be omitted, in which case the fingers 134 would contact the flat face of hub 132 at two points thereon spaced ninety degrees apart. The diaphragms 80 of the control valve units 66 are subject to atmospheric pressure effective for normally holding the points of fingers 134 in pressure contact with hub 132, in the grooves 133. The actuating levers 89 are then flexed rearward slightly, the extent of flexure being determined by the adjustment of a set screw 136 threaded through the bight portion of stirrup 87 into contact with lever 89 and secured in adjustment by a jam nut 137. As will be understood from what has been said, the head 118 and neck 119 thereof and associated parts together provide an operating control means mounted for rocking or tilting movement in two planes perpendicular to each other, the parts in rear of cap 121 include the operating control member or handle 123 for tilting such means and indicating the direction of movement thereof.

In practice, the control valve assembly is mounted in a position to be readily accessible to the driver of the automobile, conveniently on the instrument panel, and is so disposed that the groove 133 receiving finger 134 of actuating lever 89 of the control valve unit 66 for motor 37 is disposed in a plane $a^2$—$a^2$, Figure 8, substantially parallel with the plane of axis $a$—$a$ of Figure 2 and the other groove 133 is disposed in a plane $b^2$—$b^2$ substantially parallel with the plane of axis $b$—$b$ of Figure 2. The mounting plate 115 may be provided with an upward extension 115a for convenience in mounting the assembly in the manner stated, though it may be mounted in any suitable manner. Normally, the control valve unit 65, 66, for each of the motors 37 and 38 is closed to both suction and atmosphere and the sealing valve members 105 are also closed, as shown in Figure 9, the actuating lever 89 of each unit being then flexed rearward as previously explained.

Figure 10:
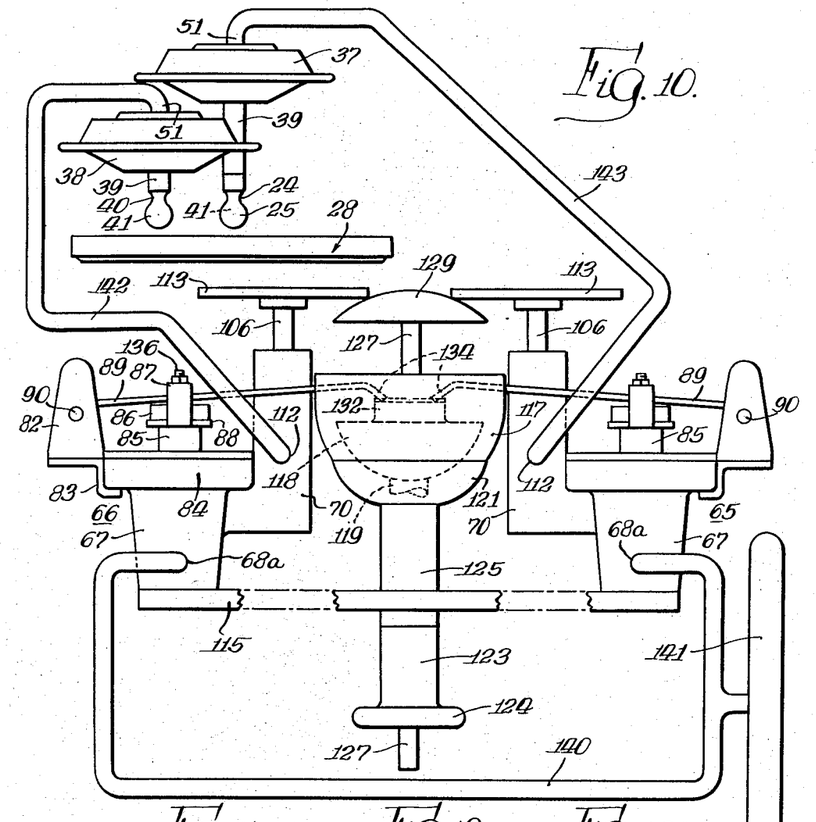
Figure 10 is a diagrammatic view of the mirror and the adjusting and control valve means therefor embodying my invention.

Referring to the diagram of Figure 10, nipples 68a of the two motor control valve units 65 and 66 are connected by a conduit 140 to a suitable source of suction, such as the intake manifold 141 of the automobile engine. Nipple 112 of the left hand unit 66 is connected by a conduit 142 to the nipple 51 of motor 38 and nipple 112 of the right hand unit 65 is connected by conduit 143 to nipple 51 of motor 37. It may be assumed, for purposes of description, that the motors 37 and 38 are under suction, trapped therein by the sealing valve members 105, of a value to hold the diaphragms 58 thereof midway between their extreme positions in either direction, with the handle 123 in its central horizontal position and hub 132 in its position shown in Figure 12. If it is desired to turn the mirror toward the left, clockwise about the axis a—a of Figure 3, the handle 123 is moved toward the left and the plunger 127 is projected, opening the sealing valve members 105. That moves the hub 132 to its position shown in Figure 11 and swings actuating lever 89 of the valve unit of motor 38 forward. Lever 89 pulls diaphragm 80 forward, unseating valve element 97 and opening chamber 77 to suction, with valve element 95 remaining seated, as will be understood from Figure 9. That connects motor 38 to suction, and retracts operating rod 39 of that motor thereby turning the mirror toward the left, the movement of the mirror following the direction of movement of the operating control member. The suction obtaining in chambers 76 and 77 causes rearward movement of diaphragm 80, by atmospheric pressure, effective for seating valve element 97 and flexing valve actuating lever 89. The outward or forward pull exerted by lever 89 on diaphragm 80 is then counteracted by the inward or rearward atmospheric pressure on diaphragm 80.

The valve elements 95 and 97 are then both seated, chamber 77 is closed to both suction and atmosphere, with the parts in their positions shown in Figure 9, and the suction is trapped in motor 38. The extent of adjustment of the mirror is determined by the extent of movement of the operating control member, as will be understood from what has been said. When the mirror has been adjusted to the desired extent, plunger 127 is released and the sealing valve members 105 close, sealing the partial vacuum or suction in motor 38, effective for holding the mirror in its adjusted position, to guard against possible leakage of the control valve unit for motor 38. To turn the mirror toward the right, counterclockwise about axis a—a of Figure 3, plunger 127 is projected and the handle 123 is moved toward the right thereby moving hub 132 from its position of Figure 12 to its position of Figure 13. The valve actuating lever 89 then swings rearward and the diaphragm 80 is moved rearward by atmospheric pressure, due to the partial vacuum then present in chamber 77. That opens valve element 95, with valve element 97 held seated under pressure by compression spring 99. The chamber 77 is then closed to suction and open to atmosphere and air flows to motor 38 reducing the suction therein. The mirror is then turned counterclockwise by the spring 62 of motor 38. The extent of such turning is determined by the extent of movement of the operating control member and the hub 132, as before. If the hub 132 is turned to its extreme position shown in Figure 13, the mirror will be turned counterclockwise to its maximum extent, limited by contact of disc 60 with cover section 47 of motor 38, as shown in Figure 4 in respect to motor 37. If the hub 132 is turned from its position of Figure 12 to its extreme position of Figure 11, with the sealing valve members 105 open, the mirror will be turned clockwise to maximum extent. Adjustment of the mirror to any position between those two extremes may be effected by turning hub 132 the corresponding distance in proper direction and opening the sealing valve members 105, as will be understood from what has been said. Opening of the sealing valve member for motor 37 during adjustment of the mirror by motor 38 does not affect motor 37 because it is then closed to both suction and atmosphere with both of the valve elements 97 and 95 of its control valve unit 66 seated, as shown in Figure 9. Also, the point of contact of finger 134 of actuating lever 89 of the control valve unit of motor 37 is on a radius of hub 132 spaced ninety degrees from the point of contact of finger 134 of actuating lever 89 of the control valve unit 66 of motor 38. Accordingly, movement of hub 132 for actuating motor 38 does not impart any movement to the actuating lever 89 of the control valve unit 65 of motor 37.

Figures 11, 12, 13, 14, 15, 16:
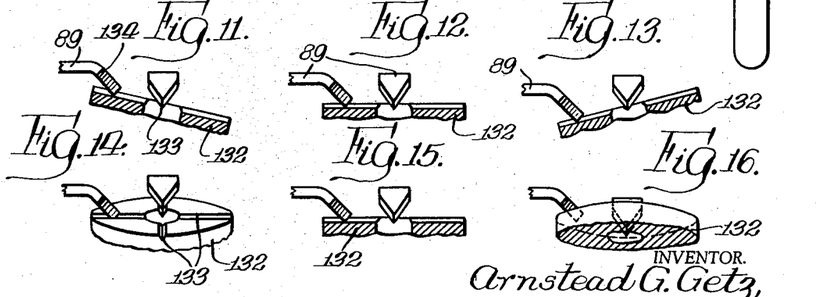
Figures 11 to 16, inclusive, are diagrammatic views illustrating the various positions of the operating control member and the control valve actuating levers operated thereby.
Figures 17, 18, 19, 20:
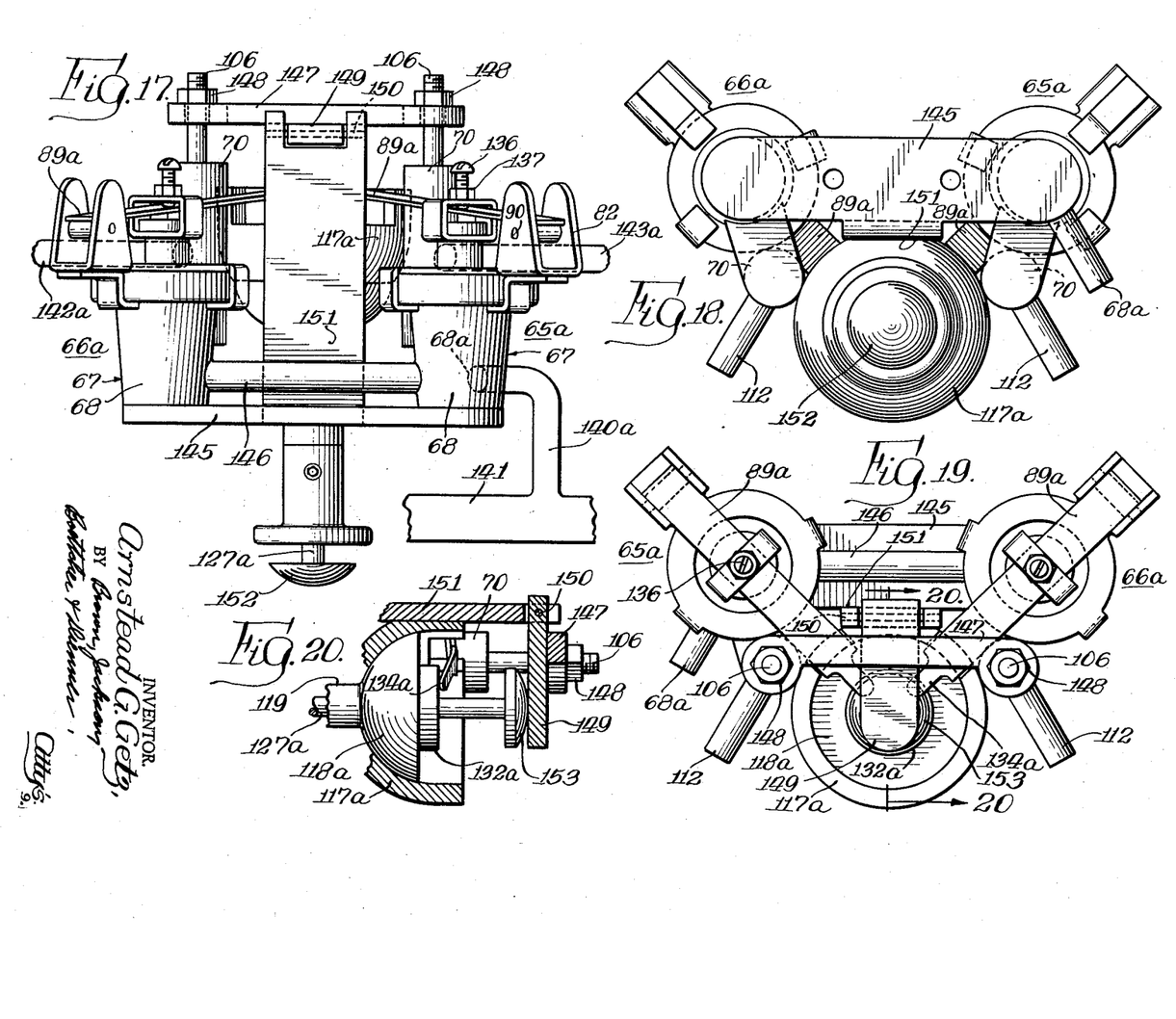
Figure 17 is a top plan view of a modified form of control valve assembly.
Figure 18 is a rear view of the control valve assembly of Figure 17.
Figure 19 is a front view of the control valve assembly of Figure 17.
Figure 20 is a sectional view, taken substantially on line 20—20 of Figure 19, partly broken away.

In order to tilt the mirror downward about axis b—b of Figure 3, the handle 123 is moved downward thereby moving hub 132 from its normal position shown in Figure 15, which is the same as its position shown in Figure 12, to its position shown in Figure 14. That swings the actuating lever 89 of the control valve unit 65 of motor 37 rearward thereby connecting that motor to suction, the sealing valve members 105 being open. The diaphragm 58 of motor 37 is then moved forward, effective for tilting the mirror downward. To tilt the mirror upward, the operating control member is moved upward, thereby moving the hub 132 from its position of Figure 15 to its position of Figure 16. That connects motor 37 to atmosphere, the sealing valve members 105 being open, and the diaphragm 58 of motor 37 is moved rearward by spring 62 effective for tilting the mirror upward about axis b—b of Figure 3. The maximum extent of such tilting movement is limited by contact of disc 60 with cover section 47 of motor 37, as shown in Figure 4. As will be understood from what has been said, the operation of motor 37 and its associated control valve unit 65 is the same as that of motor 38 and its control valve unit 66, and need not be repeated here in detail. Also, adjustment of the mirror by motor 37 does not affect motor 38, for the same reason explained above that adjustment of the mirror by motor 38 does not affect motor 37. By having the points of connection of the motors 37 and 38 on the axes a—a and b—b of Figure 3, the mirror may be adjusted about either axis without affecting its adjustment about its other axis, and the mirror is independently adjustable about such axes respectively.

The modified form of control valve assembly shown in Figures 17 to 20 is similar to that of Figures 5 to 9, and a brief description thereof will suffice. It comprises two control valve units 65a and 66a the rearward ends of the cylinders 68 of which are joined by a cross plate 145, which may be secured to the mounting plate 115 in any suitable manner. The suction chamber 76 of unit 65a is connected by a cross tube 146 to the suction chamber 76 of unit 66a. Unit 65a is provided with a nipple 68a opening into its suction chamber 76 and connected by a conduit 140a to the intake manifold 141. The stems 106 of the sealing valve members 105 extend loosely through the ends of a cross bar 147 and have threaded thereon abutment members, in the form of nuts 148, seating on the forward face of bar 147. A finger 149 is pivoted at its upper end, at 150, in the bifurcated forward end of an arm 151 extending forwardly from plate 145. The finger 149 extends across the rearward face of bar 147 in close proximity thereto. Plunger 127a is provided at its rearward end with a rounded head 152 and at its forward end with a head 153 the forward face of which is rounded and curved about the center of movement of head 118a of the operating control means. The forward face of hub 132a is flat, without radial grooves. The socket member 117a for head 118a is secured between barrels 70 and arm 151 and is provided with slots receiving the control valve operating levers 89a of the control valve units, as before. Head 153 of plunger 127a contacts finger 149 effective for swinging the latter forward, thereby moving cross bar 147 forward effective for opening the sealing valve members 105, when plunger 127a is projected. The control valve operating levers 89a are provided at their inner ends with fingers 134a of reduced width bent toward hub 132a and having rounded inner ends held in pressure contact with the flat forward face thereof, at points on radii thereof spaced ninety degrees apart. The nipple 112 of the barrel 70 of control valve unit 66a is connected by a conduit 142a to motor 38 and the nipple 112 of barrel 70 of unit 65a is connected by a conduit 143a to motor 37, as in the diagram of Figure 10. The operation of the control valve assembly of Figures 17 to 20 is the same as that of Figures 5 to 9 and need not be repeated here in detail.

Conveniently, the housings 67, barrels 70, cross plate 145 and arm 151 of the control valve assembly of Figures 17 to 20, inclusive, are formed as a unit by die casting. They may, of course, be formed in any suitable manner within the scope of my invention. The cross connection tube may be soldered or welded at its ends to the cylinders 68, in register with openings therein, and the socket member 117a may also be soldered or welded to barrels 70 and arm 151.

Within the broader aspects of my invention, the sealing valve members 105 and the operating means therefor may be omitted. The provision of the sealing valve members 105 and associated operating means is preferred as guarding against possible leaking of suction or air to the motors in the event of leakage of either of the control valves. The sealing valve members 105 when closed effectively seal the respective motors to atmosphere and to suction, trapping in the motors the desired partial vacuum, or air, as the case may be, and thereby assuring that the mirror is held in its desired adjusted position. The control operating member, associated with the control valve units in the manner above described, serves as indicating means the movement of which corresponds to the movement of the mirror so that in order to move the mirror in desired direction the driver has only to move the operating control member in the desired direction. That facilitates desired adjustment of the mirror without possible confusion such as might arise if the movements of the control member were different from those of the mirror.

It will be understood that changes in detail may be resorted to without departing from the field and scope of my invention, and I intend to include all such variations, as fall within the scope of the appended claims, in this application in which the preferred form only of my invention is disclosed.

I claim:
1. In remote control adjusting means, a device mounted for adjustment about a first axis and about a second axis perpendicular to said first axis, a source of suction, a first suction operated motor connected to said device for adjusting it about said first axis, a second suction operated motor connected to said device for adjusting it about said second axis, control valves normally closed to both suction and atmosphere individual to said motors for opening and closing the latter to suction to variable extent, an operating control member mounted for movement in a first plane in directions similar to the adjustment of said device about said first axis and in a second plane perpendicular to said first plane and in directions similar to the adjustment of said device about said second axis, and means for operating the control valve of said first motor independently of the control valve of said second motor responsive to movement of said operating control member in said first plane and operating the control valve of said second motor independently of the control valve of said first motor responsive to movement of said operating control member in said second plane, said control valves and operating means therefor comprising cooperating means actuated by atmospheric pressure and yielding means effective for closing to suction the respective motors when either thereof has been opened to suction to desired extent and for opening such motor to atmosphere when the desired extent of opening thereof to suction has been exceeded and then closing it to atmosphere when the excess of opening thereof to suction has been compensated for.

2. In remote control adjusting means, a device mounted for adjustment about a first axis and about a second axis perpendicular to said first axis, a source of suction, a first suction operated motor connected to said device for adjusting it about said first axis, a second suction operated motor connected to said device for adjusting it about said second axis, control valves normally closed to both suction and atmosphere individual to said motors for selectively opening and closing the latter to suction and to atmosphere to variable extent, an operating control member mounted for movement in a first plane in directions similar to the adjustment of said device about said first axis and in a second plane perpendicular to said first plane and in directions similar to the adjustment of said device about said second axis, and connections between said operating control member and said control valves effective for selectively and independently operating the latter, said control valves respectively comprising a member movable by atmospheric pressure in one direction to a position closing the corresponding motor to suction when it has been opened to suction to desired extent and to a position opening such motor to atmosphere when it has been opened to suction to an extent in excess of the desired extent and said connections comprising means yieldingly urging said member in the opposite direction effective for closing the corresponding motor to atmosphere when the excess opening thereof to suction has been compensated for.

3. In remote control adjusting means, a device mounted for adjustment about a first axis and about a second axis perpendicular to said first axis, a source of suction, a first suction operated motor connected to said device for adjusting it about said first axis, a second suction operated motor connected to said device for adjusting it about said second axis, control valves normally closed to both suction and atmosphere individual to said motors for selectively opening and closing the latter to suction and to atmosphere to variable extent, an operating control member mounted for movement in a first plane in directions similar to the adjustment of said device about said first axis and in a second plane perpendicular to said first plane and in directions similar to the adjustment of said device about said second axis, connections between said operating control member and said control valves effective for selectively and independently operating the latter, sealing valves individual to said motors disposed between the latter and said control valves and yieldingly held closed, and means for opening said sealing valves independently of operation of said control valves.

4. In remote control adjusting means, a device mounted for adjustment about a first axis and about a second axis perpendicular to said first axis, a source of suction, a first suction operated motor connected to said device for adjusting it about said first axis, a second suction operated motor connected to said device for adjusting it about said second axis, control valves normally closed to both suction and atmosphere individual to said motors for selectively opening and closing the latter to suction and to atmosphere to variable extent, an operating control member mounted for movement in a first plane in directions similar to the adjustment of said device about said first axis and in a second plane perpendicular to said first plane and in directions similar to the adjustment of said device about said second axis, connections between said operating control member and said control valves effective for selectively and independently operating the latter, sealing valves individual to said motors disposed between the latter and said control valves and yieldingly held closed, and means carried by said operating control member effective for opening said sealing valves preliminary to and independently of operation of said control valves.

5. In remote control adjusting means, a device mounted for adjustment about a first axis and about a second axis perpendicular to said first axis, a source of suction, a first suction operated motor connected to said device for adjusting it about said first axis, a second suction operated motor connected to said device for adjusting it about said second axis, control valves individual to said motors respectively having a suction chamber connected to said source of suction and an air inlet chamber connected to the corresponding motor, each of said valves comprising an actuating member movable in opposite directions and means actuated thereby effective for closing said air inlet chamber to atmosphere and to said suction chamber and for opening said air inlet chamber to said suction chamber responsive to movement of said actuating member in one direction and for closing said air inlet chamber to said suction chamber and opening it to atmosphere responsive to movement of said actuating member in the opposite direction, an operating control member mounted for movement in a first plane in directions similar to the adjustment of said device about said first axis and in a second plane perpendicular to said first plane and in directions similar to the adjustment of said device about said second axis, and operating connections between said operating control member and said actuating members effective for moving the latter in opposite directions independently of each other responsive to movement of said operating control member in said planes respectively.

6. In remote control adjusting means, a device mounted for adjustment about a first axis and about a second axis perpendicular to said first axis, a source of suction, a first suction operated motor connected to said device for adjusting it about said first axis, a second suction operated motor connected to said device for adjusting it about said second axis, control valves individual to said motors closing the latter to suction and to atmosphere and operable for opening the corresponding motor to suction and closing it to atmosphere and closing the corresponding motor to suction and opening it to atmosphere, each of said motors having an actuating member, and an operating control member mounted for movement in a first plane in directions similar to the adjustment of said device about said first axis and in a second plane perpendicular to said first plane and in directions similar to the adjustment of said device about said second axis, said operating control member having an element for operating said valve actuating members and the latter contacting said element at points in said planes for operation thereby effective for selectively operating said valves responsive to movement of said operating control member in said planes respectively.

7. In remote control adjusting means, a device mounted for adjustment about a first axis and about a second axis perpendicular to said first axis, a source of suction, a first suction operated motor connected to said device for adjusting it about said first axis, a second suction operated motor connected to said device for adjusting it about said second axis, control valves individual to said motors closing the latter to suction and to atmosphere and operable for opening the corresponding motor to suction and closing it to atmosphere and closing the corresponding motor to suction and opening it to atmosphere, each of said motors having an actuating member, and an operating rod mounted for tilting movement in a first plane in directions similar to the adjustment of said device about said first axis and in a second plane perpendicular to said first plane and in directions similar to the adjustment of said device about said second axis, a hub carried by said rod concentric and movable therewith disposed in cooperating relation to said valve actuating members, the latter being yieldingly held in contact with said hub at points approximately in said planes respectively, said rod having an ineffective position in which both of said valves are closed to atmosphere and to suction, movement of said rod in said planes being effective for selectively operating said valve actuating members respectively.

8. In remote control adjusting means, a device mounted for adjustment about a first axis and about a second axis perpendicular to said first axis, a source of suction, a first suction operated motor connected to said device for adjusting it about said first axis, a second suction operated motor connected to said device for adjusting it about said second axis, control valves individual to said motors closing the latter to suction and to atmosphere and operable for opening the corresponding motor to suction and closing it to atmosphere and closing the corresponding motor to suction and opening it to atmosphere, each of said motors having an actuating member, and an operating rod mounted for tilting movement in a first plane in directions similar to the adjustment of said device about said first axis and in a second plane perpendicular to said first plane and in directions similar to the adjustment of said device about said second axis, a hub carried by said rod concentric and movable therewith having a planar face perpendicular to said rod and disposed in cooperating relation to said valve actuating members, the latter being yieldingly held in contact with said hub at points approximately in said planes respectively, said rod having an ineffective position in which both of said valves are closed to atmosphere and to suction, movement of said rod in said planes being effective for selectively operating said valve actuating members respectively.

9. In remote control adjusting means, a device mounted for adjustment about a first axis and about a second axis perpendicular to said first axis, a source of suction, a first suction operated motor connected to said device for adjusting it about said first axis, a second suction operated motor connected to said device for adjusting it about said second axis, control valves individual to said motors closing the latter to suction and to atmosphere and operable for opening the corresponding motor to suction and closing it to atmosphere and closing the corresponding motor to suction and opening it to atmosphere, an operating control rod mounted for tilting movement in a first plane in directions similar to the adjustment of said device about said first axis and in a second plane perpendicular to said first plane and in directions similar to the adjustment of said device about said second axis, operating connections between said rod and said valves effective for selectively operating the latter responsive to tilting of said rod in said planes respectively, sealing valves individual to said motors disposed between the latter and said control valves and yieldingly held closed, and means for opening said sealing valves comprising a plunger slidable through said rod and yieldingly held in retracted position.

10. In remote control adjusting means, a device mounted for adjustment about a first axis and about a second axis perpendicular to said first axis, a source of suction, a first suction operated motor connected to said device for adjusting it about said first axis, a second suction operated motor connected to said device for adjusting it about said second axis, control valves individual to said motors closing the latter to suction and to atmosphere and operable for opening the corresponding motor to suction and closing it to atmosphere and closing the corresponding motor to suction and opening it to atmosphere, an operating control rod mounted at one end for tilting movement in a first plane in directions similar to the adjustment of said device about said first axis and in a second plane perpendicular to said first plane and in directions similar to the adjustment of said device about said second axis, operating connections between said one end of said rod and said valves effective for selectively operating the latter responsive to tilting of said rod in said planes respectively, sealing valves individual to said motors disposed adjacent said control valves and between the latter and said motors, said sealing valves being yieldingly held closed, a plunger slidable through said rod yieldingly held in retracted position extending beyond the other end thereof, and cooperating means carried by said plunger and said sealing valves effective for opening the later in the movement of said plunger to projected position.

11. In means for controlling the operation of two suction operated motors, two valve units respectively comprising a control valve having a suction chamber and an air inlet chamber with a restriction therebetween, a diaphragm closing the outer end of said air inlet chamber exposed to atmosphere and provided with an air admission opening, a primary valve member controlling said restriction and opening extending through the latter and provided at its outer end with a valve element of greater cross area than said opening, a resilient valve operating lever attached to said diaphragm for moving the latter outward, and an operating control member mounted for tilting movement in two planes perpendicular to each other and provided with a lever operating element, said valve operating levers contacting said operating control member element at two points approximately in said planes effective for operating said levers selectively and independently responsive to movement of said operating control member in said planes respectively.

12. In means for controlling the operation of two suction operated motors, two valve units respectively comprising a control valve having a suction chamber and an air inlet chamber with a restriction therebetween, a diaphragm closing the outer end of said air inlet chamber exposed to atmosphere and provided with an air admission opening, a primary valve member controlling said restriction and opening extending through the latter and provided at its outer end with a valve element of greater cross area than said opening, a resilient valve operating lever attached to said diaphragm for moving the latter outward, and an operating control member mounted for tilting movement in two planes perpendicular to each other and provided with a lever operating element having a planar face opposed to said levers, the latter contacting said face at two points approximately in said planes effective for operating said levers selectively and independently responsive to movement of said operating control member in said planes respectively.

13. In means for controlling the operation of two suction operated motors, two valve units respectively comprising a control valve having a suction chamber and an air inlet chamber with a restriction therebetween and a sealing valve chamber with a sealing valve therein yieldingly held closed, said air inlet chamber opening into said sealing valve chamber in advance of said sealing valve, a diaphragm closing the outer end of said air inlet chamber exposed to atmosphere and provided with an air admission opening, a primary valve member controlling said restriction and opening extending through the latter and provided at its outer end with a valve element of greater cross area than said opening, a resilient valve operating lever attached to said diaphragm for moving the latter outward, and an operating control member mounted for tilting movement in two planes perpendicular to each other and provided with a lever operating element, said valve operating levers contacting said operating control member element at two points approximately in said planes effective for operating said levers selectively and independently responsive to movement of said operating control member in said planes respectively, said operating control member and said sealing valves having cooperating means for optionally opening said sealing valves.

14. In means for controlling the operation of two suction operated motors, two valve units respectively comprising a control valve having a suction chamber and an air inlet chamber with a restriction therebetween and a sealing valve chamber with a sealing valve therein yieldingly held closed, said air inlet chamber opening into said sealing valve chamber in advance of said sealing valve, a diaphragm closing the outer end of said air inlet chamber exposed to atmosphere and provided with an air admission opening, a primary valve member controlling said restriction and opening extending through the latter and provided at its outer end with a valve element of greater cross area than said opening, a resilient valve operating lever attached to said diaphragm for moving the latter outward, an operating control member mounted for tilting movement in two planes perpendicular to each other and provided at one end with a lever operating element having a planar face opposed to said levers, the latter contacting said face at two points approximately in said planes effective for operating said levers selectively and independently responsive to movement of said operating control member in said planes respectively, a plunger slidable in said operating control member yieldingly held in retracted position extending beyond the other end thereof, and cooperating means carried by said plunger and said sealing valves effective for opening the latter in the movement of said plunger to projected position.

References Cited in the file of this patent

UNITED STATES PATENTS

| | | |
|---|---|---|
| 2,218,936 | Melown | Oct. 22, 1940 |
| 2,330,567 | Ehrenberg | Sept. 28, 1943 |
| 2,368,628 | Bates | Feb. 6, 1945 |
| 2,430,808 | Eaton | Nov. 11, 1947 |
| 2,656,764 | Johnson | Oct. 27, 1953 |